(12) United States Patent
Riise et al.

(10) Patent No.: US 8,633,256 B2
(45) Date of Patent: Jan. 21, 2014

(54) CONTROL OF THE MELT FLOW RATE OF POLYOLEFIN MIXTURES RECOVERED FROM POST-CONSUMER DURABLE GOODS

(75) Inventors: Brian L. Riise, San Ramon, CA (US); Hyung Baek, Pinole, CA (US)

(73) Assignee: MBA Polymers, Inc., Richmond, CA (US)

( * ) Notice: Subject to any disclaimer, the term of this patent is extended or adjusted under 35 U.S.C. 154(b) by 0 days.

(21) Appl. No.: 13/586,596

(22) Filed: Aug. 15, 2012

(65) Prior Publication Data

US 2013/0046034 A1 Feb. 21, 2013

Related U.S. Application Data

(60) Provisional application No. 61/523,945, filed on Aug. 16, 2011.

(51) Int. Cl.
*C08G 18/16* (2006.01)
*C08G 18/22* (2006.01)

(52) U.S. Cl.
USPC .............................. 521/47; 528/125; 528/218

(58) Field of Classification Search
USPC ..................................... 521/47; 528/125, 218
See application file for complete search history.

(56) References Cited

U.S. PATENT DOCUMENTS

| 5,895,790 A * | 4/1999 | Good ............................... 521/47 |
| 2002/0128394 A1 | 9/2002 | Gorski et al. |
| 2007/0200272 A1* | 8/2007 | Horst et al. .............. 264/211.24 |

FOREIGN PATENT DOCUMENTS

| DE | 3742845 C2 | 7/1989 |
| DE | 10343964 A1 | 4/2005 |

OTHER PUBLICATIONS

International Search Report and Written Opinion; Dec. 3, 2012; World Intellectual Property Organization (WIPO) (International Bureau of); PCT/US2012/050979; 12 pages.

* cited by examiner

*Primary Examiner* — Terressa Boykin
(74) *Attorney, Agent, or Firm* — Fish & Richardson P.C.

(57) ABSTRACT

A process for creating polyolefin blends from waste streams with controlled rheological properties can include processing a waste stream to make a mixture comprising a mixture comprising polypropylene and polyethylene and compounding the mixture with one or more peroxides or nitroxides to produce a polyolefin blend. For example, a process can include: determining the required melt flow rate of the end product; determining the ratio of polyethylene to polypropylene to achieve the required melt flow rate; effecting a separation of polypropylene from polyethylene to achieve the desired composition; determining the amount of peroxide or peroxide concentrate required to increase the melt flow rate to the required level; melt compounding the mixture; evaluating the melt flow rate of the product; and adjusting the composition of polyethyelene and polypropylene or the amount of peroxide added if necessary to achieve the required melt flow rate.

24 Claims, 5 Drawing Sheets

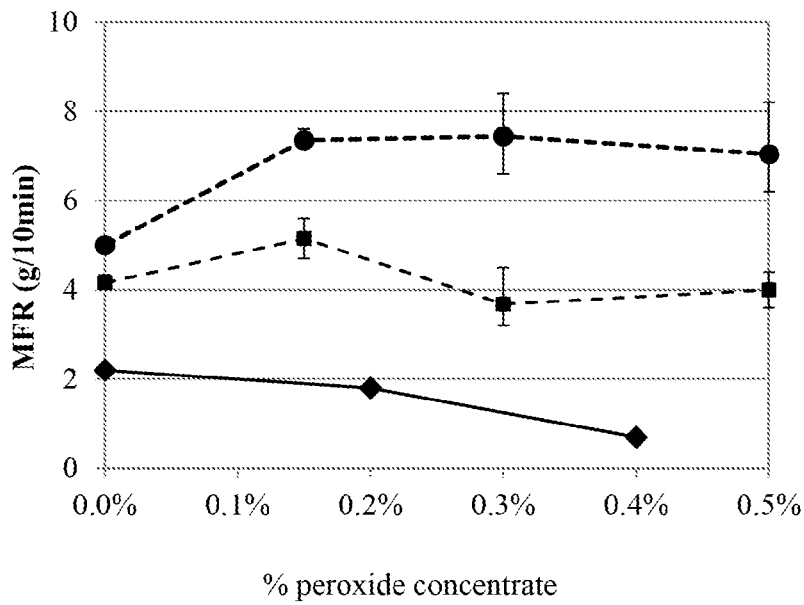
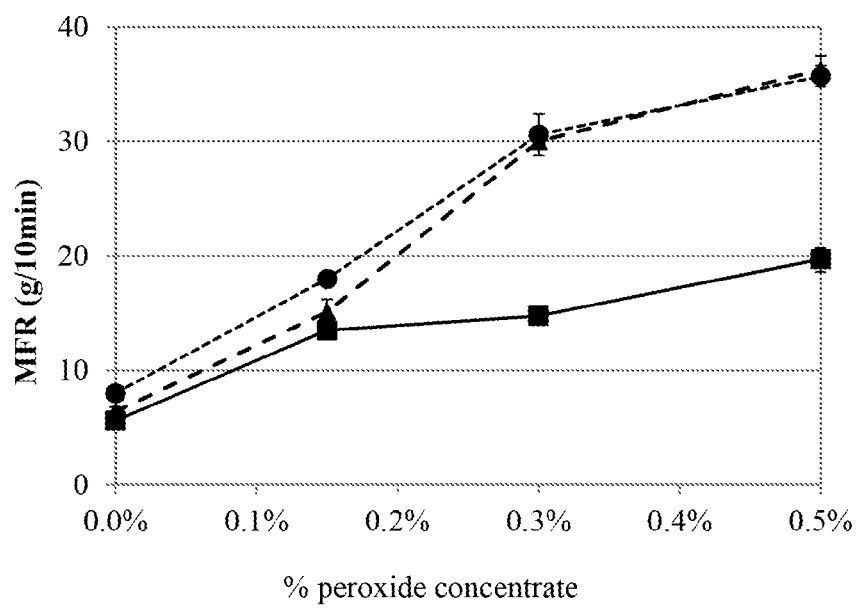

US 8,633,256 B2

CONTROL OF THE MELT FLOW RATE OF POLYOLEFIN MIXTURES RECOVERED FROM POST-CONSUMER DURABLE GOODS

CLAIM OF PRIORITY

This application claims priority under 35 USC §119(e) to U.S. Provisional Application Ser. No. 61/523,945, filed on Aug. 16, 2011, the entire contents of which are hereby incorporated by reference.

TECHNICAL FIELD

This disclosure relates to plastics with controlled rheological properties, including plastics from streams of waste plastics and other materials.

BACKGROUND

Durable goods streams such as those derived from waste electrical and electronic equipment (WEEE) or end-of-life vehicles (ELV) contain a wide variety of plastics. The stream can be processed to recover acrylonitrile-butadiene-styrene (ABS), high impact polystyrene (HIPS), polypropylene (PP) and polyethylene (PE) plastics.

The properties of products recovered from WEEE or ELV streams depend on the plastic compositions and mixtures of grades. The properties can be modified by the use of additives or by blending with virgin plastics.

The properties of PP recovered from ELV streams are no exception, with the melt flow rate (MFR) based on the mixture of plastic types and grades. In some cases, the MFR of the PP product recovered from ELV streams is lower than what is desired by customers for the material. Because of this, methods are needed to adjust and control the MFR of PP recovered from ELV streams.

SUMMARY

This disclosure describes a method to control the MFR of the PP product, including compositional ranges of blends of PP and HDPE from ELV streams that allow the use of additives to increase the MFR. This disclosure also describes a recycled polyolefin blends having particular rheological properties. In some embodiments, the polyolefins are recovered from ELV streams.

BRIEF DESCRIPTION OF THE DRAWINGS

FIG. 6 shows the melt flow rate (230° C./2.16 kg, ISO 1133) of PP/HDPE blends from shredded ELVs as a function of the amount of added peroxide concentrate. The amount of HDPE in the blends is sufficiently high to prevent any significant increase in the MFR.

FIG. 7 shows the melt flow rate (230° C./2.16 kg, ISO 1133) of PP/HDPE blends from shredded ELVs as a function of the amount of added peroxide concentrate. The amount of HDPE in the blends is sufficiently low to enable significant increases in the MFR.

DETAILED DESCRIPTION

This application describes methods and compositions to control the rheological properties (especially the melt flow rate) of mixtures of polyolefins (PP and PE) recovered from mixtures of end-of-life durable goods, especially end-of-life vehicles (ELV). A polyolefin blend can be made using the mixtures of polyolefin. In some embodiments, the polyolefin blend includes at least 50 weight percent of polyolefin derived from waste streams (e.g., ELV). In some embodiments, at least 80 weight percent of the polyolefin in the polyolefin blend are derived from a waste stream. In certain embodiments, the polyolefin blend includes greater than 95 weight percent of polyolefin recovered from waste streams.

Figure 1:
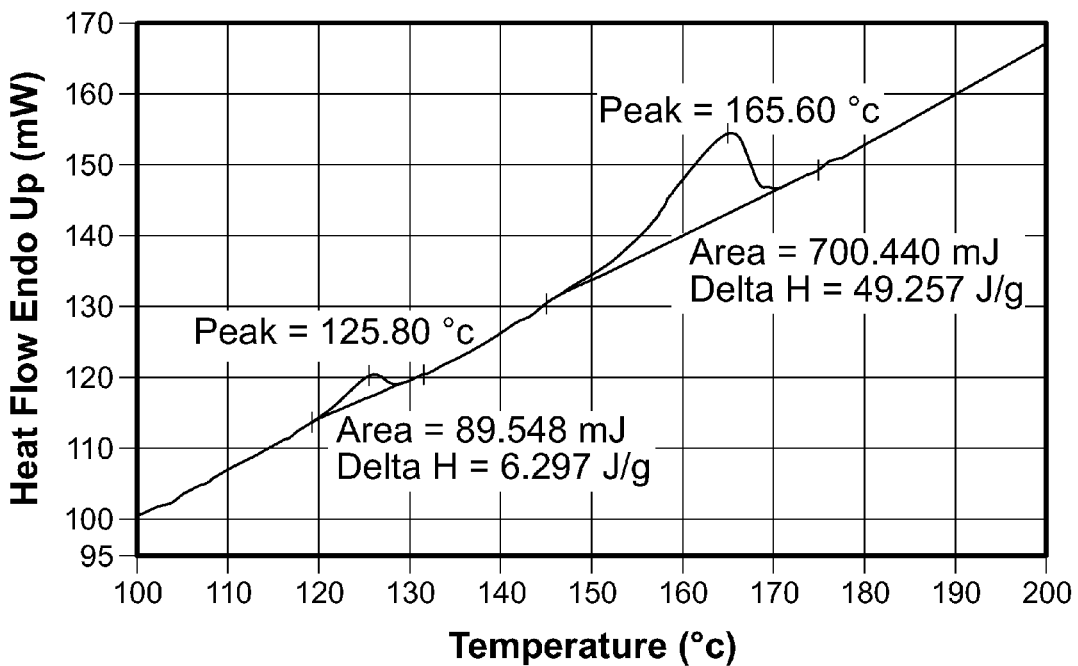
FIG. 1 shows the DSC heating curve (10° C. per minute) for a PP product containing a small amount of HDPE

Much of the PP recovered from ELV streams is in the form of impact copolymer PP (icPP). This material can be a mixture of several icPP grades when recovered from ELVs. Some of the icPP is derived from bumpers and some is derived from other parts of the automobile (e.g. interior trim parts). Mixtures from shredded ELVs can also contain other durable goods such as those found in WEEE, so the PP found in ELV streams can also include PP copolymers such as those found in certain types of WEEE such as small domestic appliances. The mixture of PP grades (both icPP grades and other copolymer grades) contains blocks of polypropylene and polyethyelene, resulting in distinct melting points at around 126° C. and 165° C. (see FIG. 1).

Figure 2:
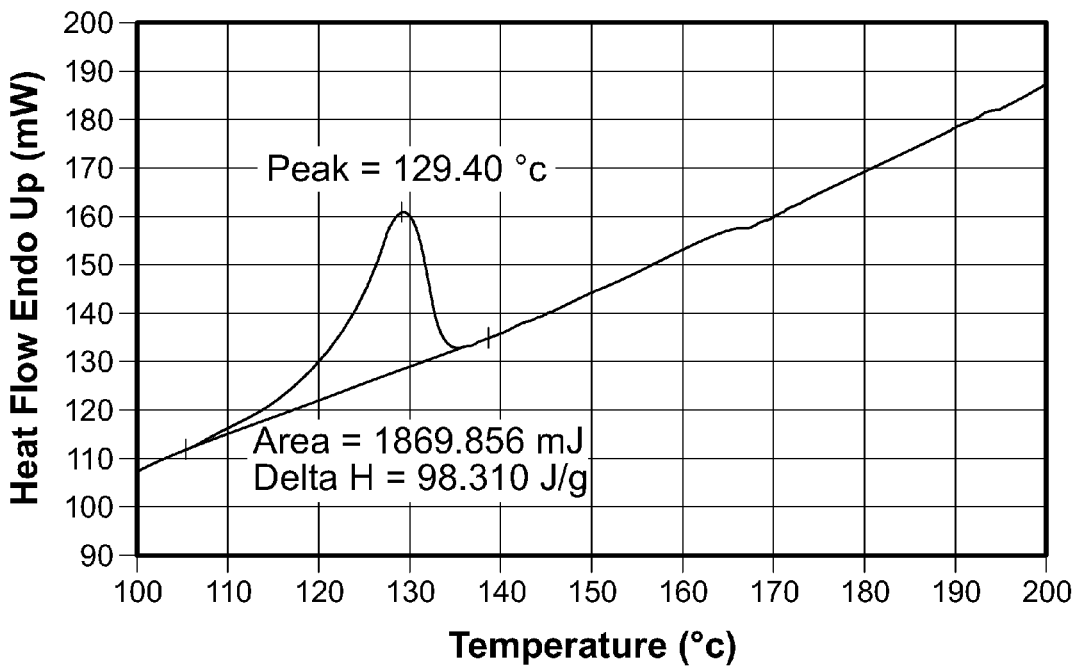
FIG. 2 shows the DSC heating curve (10° C. per minute) for an HDPE product containing a small amount of PP

ELV streams also contain substantial levels of PE. Much of the PE in ELV streams is high density polyethylene (HDPE). Automobile fuel tanks can contain mostly high density polyethylene (HDPE) along with lesser amounts of barrier materials such as ethylene vinyl alcohol (EVOH, which is a copolymer containing ethylene and vinyl alcohol repeat units), polyamides or other barrier materials, and adhesives to attach the barrier material to the HDPE. Some HDPE in ELV streams is derived from containers for windshield wiper fluid or other parts of the automobile. HDPE derived from ELV streams has a melting point around 130° C. (see FIG. 2).

Both PP and HDPE have specific gravities below 1, so they can report in the same process stream when water is used as a medium for separation of materials by density. In mixtures of these materials, it is possible to further separate PP from HDPE. It can be expensive and technically challenging to separate these materials into high purity streams, though, and it is not always necessary to do so in order to create products with favorable mechanical properties.

Even though most plastics other than PP and HDPE can be removed by density separations, it can be the case that small amounts of higher density plastics are found in mixtures containing primarily PP and HDPE. For example, plastics such as ABS and HIPS can be found in these streams in small but measurable amounts (e.g. less than 5 percent by weight in sum). In some embodiments, the resulting polyolefin blend can include less than 1 weight percent of ABS and/or less than 1 weight percent of HIPS. In some embodiments, the resulting polyolefin blend can include at least 0.001 weight percent of ABS, HIPS, or a combination thereof.

Other plastic, thermoset and elastomeric materials can also have specific gravities less than 1, so they can be found in the stream of primarily PP and HDPE. Such materials can include, but are not limited to, polyurethane (both thermoplastic and thermoset varieties, including structural foam) and rubber.

After separation, the PP product tends to contain mostly PP and HDPE, with the other plastics present in amounts small enough (e.g. less than about 5 weight percent, less than about 2 percent by weight, or less than about 1 weight percent in sum) to not significantly affect the rheological properties of the PP. In some embodiments, the polyolefin blend includes between 0.01 and 1 weight percent of EVOH. In some embodiments, the polyolefin blend can include between 0.001 and 1 weight percent of polyamides.

Figure 3:
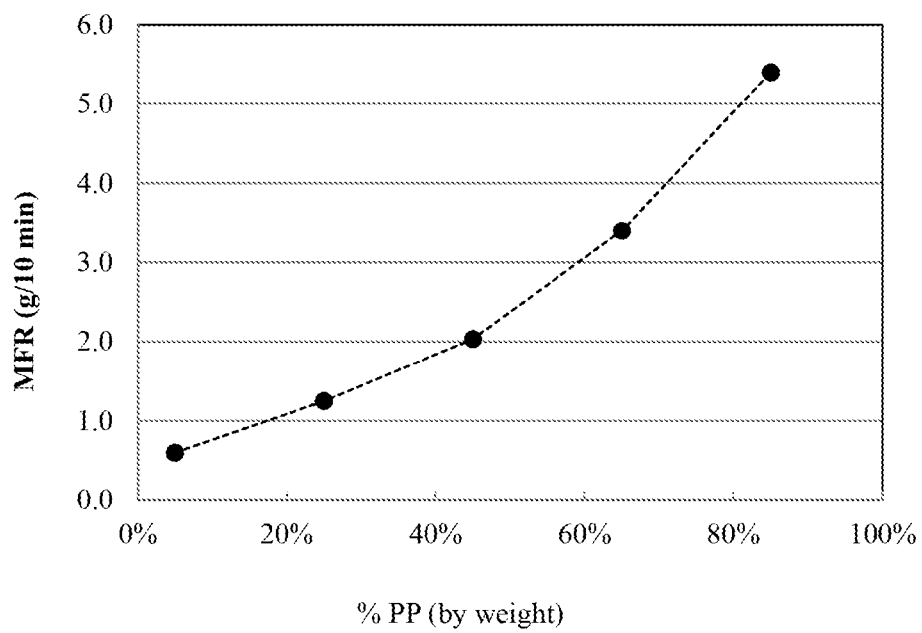
FIG. 3 shows the melt flow rate (230° C./2.16 kg, ISO 1133) of PP/HDPE blends from shredded ELVs as a function of composition

The rheological properties of blends of PP and HDPE depend on the ratio of these materials in the blend. Mixtures containing almost pure PP (as recovered from ELV streams) can have a melt flow rate (MFR at 230° C. and 2.16 kg load, per ISO 1133) of approximately 7 g/10 min or greater. HDPE, on the other hand, can have a very low MFR (when measured at 230° C. and 2.16 kg load, per ISO 1133). FIG. 3 shows the MFR (230° C./2.16 kg, ISO 1133) of PP/HDPE blends from shredded ELVs as a function of composition.

The ratio of PP to HDPE in PP products can be controlled by the mix of materials in the feed stream and/or by the degree of separation of the two plastic types.

The ratio of the materials in the ELV-derived feed stream can be controlled to some extent by whether parts such as fuel tanks (primarily HDPE) and bumpers (primarily icPP) are included in the mixture. Bumpers can be removed and sold directly for their value as a relatively pure material, which can reduce the content of PP in the mixture of plastics from shredded ELV. It is also possible to remove fuel tanks Other parts containing PP (e.g. interior trim parts or small domestic appliances) or HDPE (e.g. containers for windshield wiper fluids) can also be present in the mixture, though, so it is not feasible to completely control the composition by selective removal of bumpers or fuel tanks The ratio of PP to HDPE can also be controlled to a large extent by the degree of separation achieved in the plastic recovery and purification process. Density separation in water can be used to separate plastics based on density, but both PP and HDPE report to the same stream in such a separation because they are both less dense than water. Further separation methods can enable the separation of PP from HDPE. Methods such as triboelectrostatic separation or sorting based on absorption or fluorescence of certain types of radiation (e.g. near infrared absorption or Raman fluorescence) can be used to accomplish the separation, for example. Such separations are not necessarily complete, however, so polyolefin products with various ratios of PP to HDPE can be produced.

Figure 4:
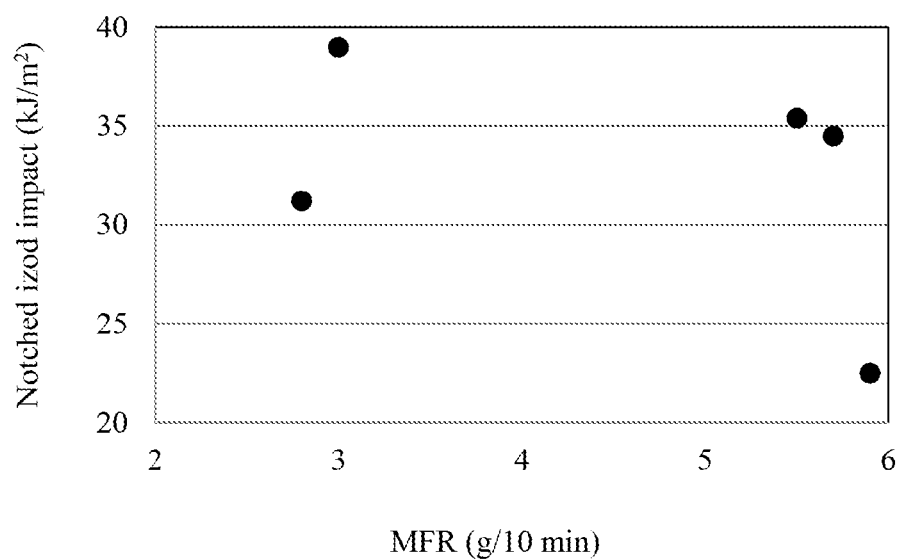
FIG. 4 shows the notched izod impact strength (ISO 180) of PP/HDPE blends from shredded ELVs as a function of the MFR of the blend.

Even though the melt flow rate (MFR) of the PP/HDPE blends can be highly dependent on the composition (see FIG. 3), the mechanical properties of blends of HDPE with PP are actually quite good over a broad range of compositions. This means that it is not necessary to perform a perfect separation if the primary goal is to create products with favorable mechanical properties. FIG. 4 shows the notched izod impact strength as a function of the melt flow rate, which is also a function of the composition according to FIG. 3.

For some applications, it can be desirable to use a PP product with a MFR greater than 6 g/10 min. It is possible to recover such products by ensuring that the PP product contains less than about 10 percent (by weight) HDPE.

Other applications can require a PP product with a MFR much higher than that produced by merely purifying the PP in the mixture. Such applications can require PP grades with MFRs over 15 g/10 min or even over 30 g/10 min. In some embodiments, the polyolefin blend has a MFR of between 8 g /10 min and 40 g/10 min. In some embodiments, the polyolefin blend has a MFR of between 10 g/10 min and 30 g/10 min. For example, the polyolefin blend can have a MFR of between 15 g/10 min and 20 g/10 min.

Methods are available to increase the MFR of PP. For example, peroxides and nitroxides can be used to cause chain scission of PP. In some embodiments, between 0.005 and 0.2 weight percent of peroxide is added to form the polyolefin blend. This results in a lower molecular weight polypropylene that is suitable for applications requiring a higher MFR (i.e. lower viscosity).

Oxidation of PE can result in cross-linking, though, so adding peroxides or nitroxides to blends of PE and PP can result in competing mechanisms that may not necessarily result in a higher MFR product.

In order to achieve MFRs greater than about 8 g/10 min in PP products recovered from ELV streams, it is possible to use commercially available peroxides and nitroxides. Examples 1-3 describe how the concentration of PP must be greater than about 85% in order for the increase to occur, and above about 90% for a particular peroxide additive to be most effective.

Example 4 demonstrates how various peroxide additives perform similarly to the peroxide additive described in Examples 1-3.

Figure 5:
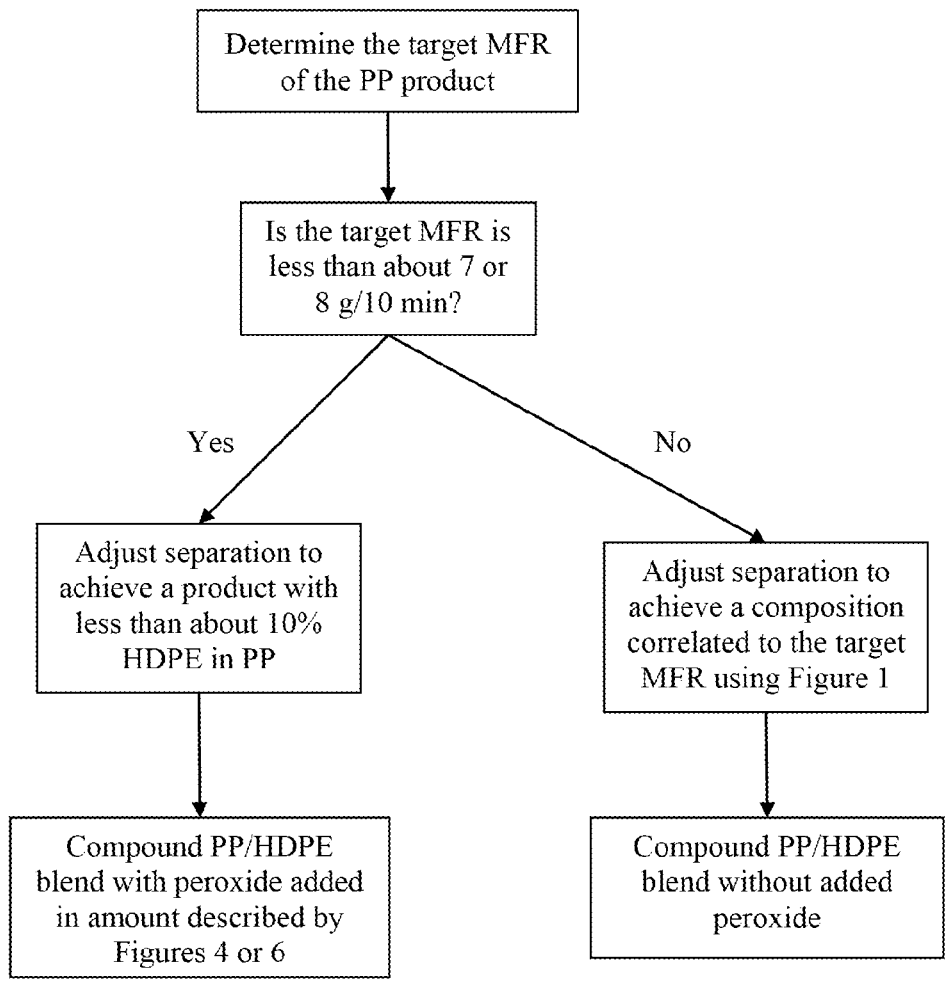
FIG. 5 shows a process used to control the MFR of PP/HDPE blends

Based on the information above, the process summarized in FIG. 5 can be used to create PP/HDPE blends of controlled MFR from ELV plastic streams.

The first step in the process shown in FIG. 5 is to determine the target MFR. This can be obtained based on market requirements.

The next step in the process shown in FIG. 5 is to define the following step based on whether the target MFR of the product is greater than or less than about 7 to 8 g/10 min (230° C./2.16 kg load, per ISO 1133).

If the target MFR is less than about 7 to 8 g/10 min, the separation of PP from HDPE should be adjusted to achieve the target composition (with MFR related to composition according to FIG. 3).

If the target MFR is greater than about 7 to 8 g/10 min, the separation of PP from HDPE should be controlled to create a composition containing less than about 10% HDPE. An amount of peroxide concentrate should then be used based on the information in FIG. 7.

EXAMPLES

The following examples demonstrate how the specific properties of PP/HDPE blends can be achieved by controlling the composition and the use of additives.

Example 1

Adding Peroxide to Polyolefin Products with High HDPE Levels

Polyolefin products with three different ratios of PP to HDPE were compounded with various loadings of a peroxide concentrate called NST 10081 available from Nanosyntex (Morristown, Tenn.). The peroxide was present at 20% (by weight) in a polypropylene carrier resin. Compounding was performed in a small lab twin screw extruder with a melt temperature of approximately 220° C.

The starting melt flow rates of the three base polyolefin products were 2.2 g/10 min, 4.2 g/10 min and 5.0 g/10 min. Using FIG. 3, we determine that the approximate HDPE compositions of these samples are as shown in Table 1.1.

TABLE 1.1

Approximate compositions (percent by weight) of base polyolefins of Example 1

| Base MFR (g/10 min) | Approximate % HDPE | Approximate % PP |
| --- | --- | --- |
| 2.2 | 53% | 47% |
| 4.2 | 28% | 72% |
| 5.0 | 19% | 81% |

The melt flow rates of the compounded pellet samples were measured at 230° C. with a 2.16 kg load according to ISO 1133. FIG. 6 shows the melt flow rates as functions of the amount of peroxide concentrate added. The effect of the added concentrate is small even at high loadings.

Example 2

Adding Peroxide to Polyolefin Products with Low HDPE Levels

Polyolefin products with three different ratios of PP to HDPE were compounded with various loadings of a peroxide concentrate called NST 10081 available from Nanosyntex (Morristown, Tenn.). The peroxide was present at 20% (by weight) in a polypropylene carrier resin. Compounding was performed in a small lab twin screw extruder with a melt temperature of approximately 220° C.

The starting melt flow rates of the three base polyolefin products were 5.6 g/10 min, 6.4 g/10 min and 8.0 g/10 min. Using FIG. 3 and extrapolating to higher purities of PP, we determine that the approximate HDPE compositions of these samples are as shown in Table 2.1.

TABLE 2.1

Approximate compositions (percent by weight) of base polyolefins of Example 1

| Base MFR (g/10 min) | Approximate % HDPE | Approximate % PP |
| --- | --- | --- |
| 5.6 | 13% | 87% |
| 6.4 | ~10% | ~90% |
| 8.0 | <5% | >95% |

The melt flow rates of the compounded pellet samples were measured at 230° C. with a 2.16 kg load according to ISO 1133. FIG. 7 shows the melt flow rates as functions of the amount of peroxide concentrate added. The effect of the added concentrate is significant for all three samples, with the amount of peroxide being somewhat more effective for the samples containing less HDPE.

Example 3

Determination of Maximum HDPE Concentration for Effective Use of Peroxides to Increase the MFR In order to determine the maximum concentration of HDPE in the polyolefin mixtures that allows us to increase the MFR using the NST 10081 peroxide concentrate, we performed linear regression on the curves shown in FIGS. 6 and 7.

Figure 8:
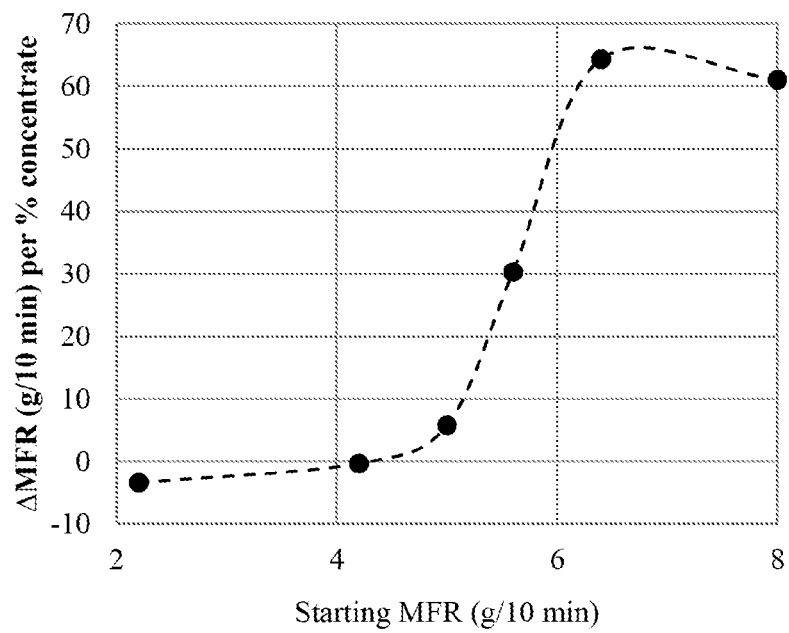
FIG. 8 shows the increase in MFR (230° C./2.16 kg, ISO 1133) per percent peroxide concentrate added to PP/HDPE blends from shredded ELVs as a function of the MFR of the base mixture.

FIG. 8 shows the slopes of the various curves as functions of the MFR of the base polyolefin mixtures. From this curve, we determine that the peroxide concentrate is most effective when the base MFR is greater than about 6 g/10 min. Using this value and FIG. 3, we determine that the HDPE content of the polyolefin mixture should be less than about 10% in order to allow for maximum effectiveness of the peroxide.

Example 4

Adding Different Peroxide and Nitroxide Concentrates to a Polyolefin Product with a Low HDPE Level Two different types of peroxide were added to a polyolefin product with a base MFR of 6.8 g/10 min (corresponding to approximately 90% PP and 10% HDPE). Two different peroxide concentrates from Nanosyntex (Morristown, Tenn.) were used. NST 10081 from Nanosyntex is a 20% (by weight) concentrate of a peroxide in a low density polyethylene carrier resin. NST 10081P from Nanosyntex contains 10% (by weight) peroxide (the same active ingredient as in NST 10081) in a $CaCO_3$ powder matrix. Polyvel CR5P (Polyvel Inc., Hammonton, N.J.) is a 5% concentrate of di-(2-tert-butyl)-peroxyisopropyl benzene (a peroxide) in a polypropylene homopolymer carrier resin.

A nitroxide concentrate, Irgatec CR76 from BASF (Florham Park, N.J.) was also evaluated. Irgatec CR76 is a nitroxide-based melt flow modifier concentrate with 3.2% hydroxylamine derivative active ingredient in a polypropylene homopolymer matrix.

Compounding was performed in a small lab twin screw extruder with a melt temperature of approximately 220° C.

Figure 9:
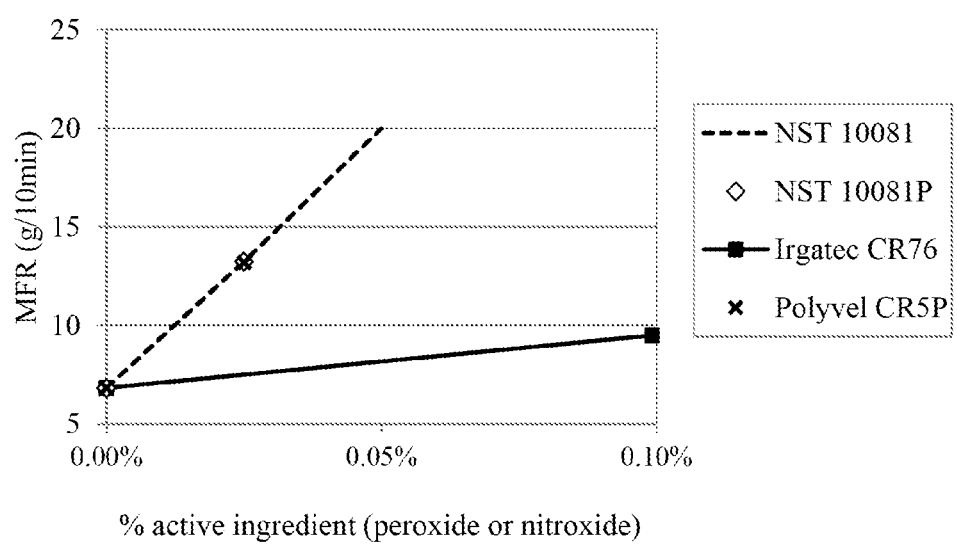
FIG. 9 shows the melt flow rate (230° C./2.16 kg, ISO 1133) of an PP/HDPE blend from shredded ELVs as a function of the amount of added peroxide or nitroxide.

FIG. 9 shows the melt flow rate (230° C./2.16 kg, ISO 1133) of the PP/HDPE blend from shredded ELVs as a function of the amount of added peroxide or nitroxide. We note that the peroxide additives seem to have similar performance, whereas the nitroxide is far less effective with this base material mixture. FIG. 9 shows that the peroxide can be added at about 0.01% to 0.1% to adjust the MFR. The peroxide does not increase the MFR of the polyolefin blends from waste materials as much as would be expected for virgin polypropylenes.

The invention claimed is:
1. A process for creating polyolefin blends from waste streams with controlled rheological properties, the process including:
   a) determining the required melt flow rate of the end product;
   b) determining the ratio of polyethylene to polypropylene to achieve the required melt flow rate, if the desired melt flow rate can be achieved with the unmodified blend
   or
   determining that the composition of the polyethylene component must be less than a certain amount if the required melt flow rate is greater than can be achieved with the unmodified blend;
   c) effecting a separation of polypropylene from polyethylene to achieve the desired composition;
   d) determining the amount of peroxide or peroxide concentrate required to increase the melt flow rate to the required level, if the required melt flow rate is greater than can be achieved with the unmodified blend;

e) melt compounding the mixture of polyolefins plus any required peroxide in an extruder;

f) evaluating the melt flow rate of the product; and g) adjusting the composition of polyethyelene and polypropylene or the amount of peroxide added if necessary to achieve the required melt flow rate.

2. A polyolefin blend recovered from waste streams having controlled rheological properties, the polyolefin blend comprising at least 85 weight percent polypropylene and having a melt flow rate of greater than 8 g/10 min.

3. The polyolefin blend of claim 2, wherein the polyolefin blend comprises at least 90 weight percent polypropylene.

4. The polyolefin blend of claim 2, wherein the polyolefin blend comprises at least 1 weight percent of polyethylene.

5. The polyolefin blend of claim 4, wherein the polyethylene comprises high density polyethylene.

6. The polyolefin blend of claim 4, wherein the polyolefin blend comprises less than 10 weight percent polyethylene.

7. The polyolefin blend of claim 4, wherein the polyolefin blend comprises between 1 and 10 weight percent high density polyethylene.

8. The polyolefin blend of claim 2, wherein the polypropylene comprises impact copolymer polypropylene.

9. The polyolefin blend of claim 8, wherein the impact copolymer polypropylene comprises blocks of polypropylene and blocks of polyethylene.

10. The polyolefin blend of claim 2, wherein the polyolefin blend comprises less than one weight percent ethylene vinyl alcohol.

11. The polyolefin blend of claim 2, wherein the polyolefin blend comprises less than five weight percent in sum of ABS and HIPS.

12. The polyolefin blend of claim 11, wherein the polyolefin blend includes less than one weight percent ABS.

13. The polyolefin blend of claim 2, wherein the polyolefin blend comprises less than one weight percent HIPS.

14. The polyolefin blend of claim 2, wherein the polyolefin blend comprises less than one weight percent of one or more polyamides.

15. The polyolefin blend of claim 2, wherein the polyolefin blend comprises less than one weight percent of one or more polyurethanes.

16. The polyolefin blend of claim 2, wherein the polyolefin blend has a melt flow rate of at least 10 g/10 min.

17. The polyolefin blend of claim 16, wherein the polyolefin blend has a melt flow rate of at least 15 g/10 min.

18. The polyolefin blend of claim 17, wherein the polyolefin blend has a melt flow rate of at least 30 g/10 min.

19. The polyolefin blend of claim 2, wherein the polyolefin blend includes at least 50 weight percent of materials recovered from a waste stream.

20. The polyolefin blend of claim 19, wherein the polyolefin blend includes at least 80 weight percent of materials recovered from a waste stream.

21. The polyolefin blend of claim 20, wherein the polyolefin blend includes at least 95 weight percent of materials recovered from a waste stream.

22. The polyolefin blend of claim 19, wherein the polyolefin blend is recovered from end-of-life vehicles.

23. The polyolefin blend of claim 1, wherein the polyolefin blend is produced by mixing one or more peroxides or nitroxides into a recovered mixture including both polypropylene and polyethylene to cause chain scission of the polypropylene, the recovered mixture including at least 85 weight percent of polypropylene.

24. The polyolefin blend of claim 23, wherein the one or more peroxides or nitroxides are mixed with the recovered mixture at a weight ratio of between 1:20,000 and 1:500 peroxide or nitroxide to the recovered mixture.

* * * * *

UNITED STATES PATENT AND TRADEMARK OFFICE
CERTIFICATE OF CORRECTION

PATENT NO. : 8,633,256 B2  
APPLICATION NO. : 13/586596  
DATED : January 21, 2014  
INVENTOR(S) : Riise et al.

Page 1 of 1

It is certified that error appears in the above-identified patent and that said Letters Patent is hereby corrected as shown below:

On the title page, Item [57], Column 2, Line 15, please delete "polyethyelene" and insert --polyethylene--, therefor.

In the Claims

Column 7, Line 4, Claim 1, please delete "polyethyelene" and insert --polyethylene--, therefor.

Signed and Sealed this  
Sixteenth Day of September, 2014

Michelle K. Lee  
*Deputy Director of the United States Patent and Trademark Office*